(12) United States Patent
Hwang et al.

(10) Patent No.: US 11,212,543 B2
(45) Date of Patent: Dec. 28, 2021

(54) METHOD AND APPARATUS FOR COMPRESSING OR RESTORING IMAGE

(71) Applicant: LG ELECTRONICS INC., Seoul (KR)

(72) Inventors: Keum Sung Hwang, Seoul (KR); Seung Hwan Moon, Siheung-si (KR); Young Kwon Kim, Seoul (KR); Hyun Dae Choi, Seoul (KR)

(73) Assignee: LG ELECTRONICS, Seoul (KR)

( * ) Notice: Subject to any disclaimer, the term of this patent is extended or adjusted under 35 U.S.C. 154(b) by 106 days.

(21) Appl. No.: 16/738,585

(22) Filed: Jan. 9, 2020

(65) Prior Publication Data

US 2021/0112261 A1 Apr. 15, 2021

(30) Foreign Application Priority Data

Oct. 10, 2019 (KR) .................. 10-2019-0125321

(51) Int. Cl.
*H04N 19/42* (2014.01)
*G06T 5/50* (2006.01)
(Continued)

(52) U.S. Cl.
CPC .............. *H04N 19/42* (2014.11); *G06T 5/50* (2013.01); *G06T 7/90* (2017.01); *G06T 11/001* (2013.01);
(Continued)

(58) Field of Classification Search
CPC . G06T 7/90; G06T 5/50; G06T 11/001; G06T 2207/10024; G06T 2207/20221; G06T 9/00–40; H04N 19/00–99
See application file for complete search history.

(56) References Cited

U.S. PATENT DOCUMENTS

| 10,319,115 B2 | 6/2019 | Park et al. |
| 2004/0260662 A1* | 12/2004 | Staelin ..................... G06N 3/08 706/16 |

(Continued)

OTHER PUBLICATIONS

Huang et al "Learned Prior Information for Image Compression" The IEEE Conference on Computer Vision and Pattern Recognition (CVPR) Workshops Jun. 2019 (Year: 2019).*

(Continued)

*Primary Examiner* — Sean T Motsinger
(74) *Attorney, Agent, or Firm* — Birch, Stewart, Kolasch & Birch, LLP

(57) ABSTRACT

A method for restoring a compressed image according to an embodiment of the present disclosure includes receiving monochrome image data and low resolution color image data generated from an original color image of the monochrome image data, decoding the monochrome image data and generating a low resolution monochrome image, decoding the low resolution color image data generating a low resolution color image; processing the low resolution monochrome image and generating a high resolution monochrome image in accordance with a super resolution imaging neural network; and generating a high resolution color image based on the low resolution color image and the high resolution monochrome image in accordance with a colorization imaging neural network. The imaging neural network of the present disclosure may be a deep neural network generated by machine learning, and images may be input and output in the Internet of Things environment using a 5G network.

8 Claims, 12 Drawing Sheets

(51) Int. Cl.
*G06T 7/90* (2017.01)
*G06T 11/00* (2006.01)

(52) U.S. Cl.
CPC ............... *G06T 2207/10024* (2013.01); *G06T 2207/20221* (2013.01)

(56) References Cited

U.S. PATENT DOCUMENTS

| | | | |
|---|---|---|---|
| 2014/0072242 A1* | 3/2014 | Wei | H04N 19/865 |
| | | | 382/299 |
| 2016/0048952 A1* | 2/2016 | Tezaur | G06T 5/004 |
| | | | 382/255 |
| 2019/0124348 A1 | 4/2019 | Yang | |
| 2019/0253593 A1* | 8/2019 | Li | G06K 9/3233 |
| 2019/0355108 A1* | 11/2019 | Chen | H04N 5/2355 |
| 2020/0045227 A1* | 2/2020 | Jiang | H04N 9/07 |
| 2020/0098144 A1* | 3/2020 | Norouzi | G06T 11/40 |
| 2020/0252654 A1* | 8/2020 | Su | H04N 19/117 |
| 2020/0311870 A1* | 10/2020 | Jung | G06N 3/04 |
| 2021/0097645 A1* | 4/2021 | Navarrete Michelini | |
| | | | G06T 5/50 |
| 2021/0112261 A1* | 4/2021 | Hwang | H04N 19/42 |
| 2021/0133926 A1* | 5/2021 | Jia | G06T 3/4053 |
| 2021/0176490 A1* | 6/2021 | Lee | G06T 3/4046 |

OTHER PUBLICATIONS

Li et al "Convolutional Neural Network-Based Block Up-Sampling for Intra Frame Coding" IEEE Transactions On Circuits and Systems for Video Technology, vol. 28, No. 9, Sep. 2018 (Year: 2018).*

* cited by examiner

METHOD AND APPARATUS FOR COMPRESSING OR RESTORING IMAGE

Pursuant to 35 U.S.C. § 119(a), this application claims the benefit of earlier filing date and right of priority to Korean Patent Application No. 10-2019-0125321, filed on Oct. 10, 2019, the contents of which are hereby incorporated by reference herein in its entirety.

BACKGROUND

1. Technical Field

The present disclosure relates to a method and an apparatus for compressing an image or restoring a compressed image, and more particularly, to a technology of compressing an image using lower resolution imaging and restoring a compressed image using super resolution imaging.

2. Description of Related Art

Image compression is a technology of reducing a data size required to store an image by performing specific processing on the image while minimizing the degradation of image quality.

Further, image processing is a technology of performing, specific operations on an image to improve image quality or extract specific information from the image.

Image compression and image processing can be broadly utilized in various fields and are core technologies essential to various fields such as autonomous vehicles, security monitoring systems, online communication, or high quality image transmission.

In accordance with the development of high resolution image sensors, 5G communication networks, and artificial intelligence, image compression and image processing are also developing. Further, in recent years, attempts are being made at developing a technology of converting each image frame of a low resolution still image and a low resolution video into a high resolution image using a deep neural network.

Further, in image compression technology, attempts are being made at developing a new technology of transmitting more streams in the same bandwidth as that of the existing technology, such as high efficiency video codec (HEVC), in order to transmit an ultra-high definition image such as in 4K or 8K.

In the meantime, an image colorization technology which converts a monochrome image into a color image is implemented through a method of spreading a color of a scribble specified by a user to the whole image and a method of converting an input image into a color image by utilizing a color of a reference image which is similar to the input image. However, a deep learning-based image colorizing method which does not require user intervention is being proposed in recent years.

A current method of compressing and restoring an image mainly excludes duplicate information, or in a case of a video, encodes the video by using information which can predict a current frame from a previous image frame.

Further, a technology of applying a neural network to compress an image is also being proposed.

Related Art 1 discloses a technology of adjusting, based on an identified object in an image, a quantization parameter of a domain including the identified object, after identifying the object from the image through a neural network.

In Related Art 1, a neural network is used to determine a reference for adjusting the quantization parameter used for the existing compression method; however, this technology adjusts only some of the parameters of the existing compression method.

Related Art 2 discloses a technology of converting a prediction block into an enhanced prediction block by applying machine learning to the prediction block generated from an input block; however, this is a technology of improving a prediction block which is a part of the existing compression method.

In order to address the above-described issues, a technology which can be added to an existing pipeline for compressing an image and improve image compression efficiency is necessary.

The above-described related art is technical information that the inventor holds for deriving the present disclosure or is acquired in the derivation process of the present disclosure, and is not necessarily a known technology disclosed to the general public before the application of the present disclosure.

RELATED ART DOCUMENT

Patent Document

Related Art 1: U.S. patent Ser. No. 10/319,115 (registered on Jun. 11, 2019)

Related Art 2: US Patent Application Publication No. 2019-0124348 (published on Apr. 25, 2019)

SUMMARY OF THE INVENTION

An aspect of the present disclosure is to address an issue in the related art in which compression efficiency cannot be significantly improved by changing a part of an internal algorithm of an existing compression method.

Another aspect of the present disclosure is to address an issue in the related art in which an artificial neural network is used only to adjust a parameter of the existing compression method or improve a prediction block.

Yet another aspect of the present disclosure is to address an issue in the related art in which a limitation of compression efficiency occurs by compressing an image while maintaining color information of the image.

In addition to an encoding method, an embodiment of the present disclosure provides a method and an apparatus for compressing and restoring an image, which convert a color image into a low resolution monochrome image in accordance with a lower resolution neural network and transmit the converted low resolution monochrome image, and after decoding the low resolution monochrome image at a reception side, convert the low resolution monochrome image into a high resolution monochrome image in accordance with a super resolution neural network coupled to and trained with the lower resolution neural network, to improve image compression and restoration efficiency. Color information may be restored to a final color image by providing a low resolution color image as a hint image from a transmission side to the reception side, and applying a colorization neural network to a low resolution color image and a high resolution monochrome image generated by a super resolution neural network at the reception side.

According to an embodiment of the present disclosure, a method for restoring a compressed image of an electronic device includes: receiving monochrome image data and low resolution color image data generated from an original color image of the monochrome image data, generating a low resolution monochrome image by decoding the monochrome image data; generating a low resolution color image by decoding the low resolution color image data; generating a high resolution monochrome image by processing the low resolution monochrome image in accordance with a super resolution imaging neural network; and generating a high resolution color image by using the low resolution color image in accordance with a colorization imaging neural network and processing the high resolution monochrome image.

Here, the generating of a high resolution color image may include: using the low resolution color image as a part of an intermediate layer of the colorization imaging neural network.

Alternatively, the generating of a high resolution color image may further include: using an intermediate resolution color image having a resolution improved from that of the low resolution color image by interpolation or a super resolution imaging neural network, as a part of the intermediate layer of the colorization imaging neural network.

According to another embodiment of the present disclosure, in a compressed image restoring method, the monochrome image data and the low resolution color image data are video data which are synchronized with each other, and the processing of a high resolution monochrome image may be using the low resolution color image corresponding to the low resolution monochrome image of the monochrome image data as a part of the intermediate layer of the colorization imaging neural network.

Further, the processing of a high resolution monochrome image may be using the low resolution color image corresponding to an intra frame of a group of pictures (GOP) including the low resolution monochrome image as a part of the intermediate layer of the colorization imaging neural network.

Further, the processing of a high resolution monochrome image may be using the low resolution color image corresponding to a previous frame of the low resolution monochrome image or the low resolution color image corresponding to a frame which is referenced by the low resolution monochrome image, as a part of the intermediate layer.

Further, the generating of a high resolution color image may include: generating at least one chrominance image by an output layer and generating a high resolution color image by coupling the chrominance image and a high resolution monochrome image.

A computer readable recording medium which stores a method for restoring a compressed image, according to an embodiment of the present disclosure, is a computer readable recording medium in which a computer program configured to execute any one of the above-described methods is stored.

According to another embodiment of the present disclosure, an image compressing method includes: converting a high resolution color image into a high resolution monochrome image and a low resolution color image; generating a low resolution monochrome image by processing the high resolution monochrome image in accordance with a lower resolution imaging neural network; generating monochrome image data by encoding the low resolution monochrome image; and generating low resolution color image data by encoding the low resolution color image.

The generating of low resolution color image data may include extracting intra frames from a result of encoding the low resolution color image or extracting frames corresponding to a predetermined interval from the result of encoding the low resolution color image; and generating the low resolution color image data by synchronizing the extracted frames with the monochrome image data.

According to another embodiment of the present disclosure, a compressed image restoring apparatus includes: a processor and a memory which is electrically connected to the processor and is configured to store at least one of at least one code executed in the processor, a parameter of a super resolution imaging neural network, or a parameter of a colorization imaging neural network, and when the memory is executed by the processor, the memory may store codes which cause the processor to generate the low resolution monochrome image and the low resolution color image by decoding the monochrome image data and low resolution color image data generated from an original color image of the monochrome image data, generate a high resolution monochrome image by processing the low resolution monochrome image in accordance with the super resolution imaging neural network, and generate a high resolution color image by using the low resolution color image in accordance with the colorization imaging neural network and processing the high resolution monochrome image.

Further, the super resolution imaging neural network may be coupled to and simultaneously trained with a lower resolution imaging neural network so as to generate a monochrome image having a first resolution using, as an input, a monochrome image having a second resolution generated from the monochrome image having the first resolution by the lower resolution imaging neural network of an image compressing apparatus, and the first resolution may be higher than the second resolution.

According to another embodiment of the present disclosure, an image compressing apparatus includes: a processor and a memory which is electrically coupled to the processor and is configured to store at least one code executed in the processor or a parameter of a lower resolution imaging neural network, and when the memory is executed by the processor, the memory may store codes which cause the processor to convert a high resolution color image into a high resolution monochrome image and a low resolution color image and generate monochrome image data and color image data by encoding the low resolution monochrome image and the low resolution color image generated by processing the high resolution monochrome image in accordance with the lower resolution imaging neural network.

Here, the lower resolution imaging neural network is coupled to and simultaneously trained with the super resolution imaging neural network of a compressed image restoring apparatus so as to generate a monochrome image having a first resolution using, as an input, a monochrome image having a second resolution generated from the monochrome image having the first resolution by the lower resolution imaging neural network, and the first resolution may be higher than the second resolution.

According to embodiments of the present disclosure, an apparatus and a method for compressing or restoring an image apply a lower resolution neural network before applying an existing compression technology, to improve image compression efficiency.

Further, according to the embodiments of the present disclosure, the existing compression technology is applied after separating an image into a low resolution monochrome image and a low resolution color image, to improve image compression efficiency.

Further, the embodiments of the present disclosure propose a new structure of compressing and restoring an image by coupling and training a lower resolution neural network which converts a high resolution image into a low resolution image and a super resolution neural network which converts a low resolution image into a high resolution image.

The effects of the present disclosure are not limited to those mentioned above and other effects not mentioned can be clearly understood by those skilled in the art from the following description.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION

Figure 1:
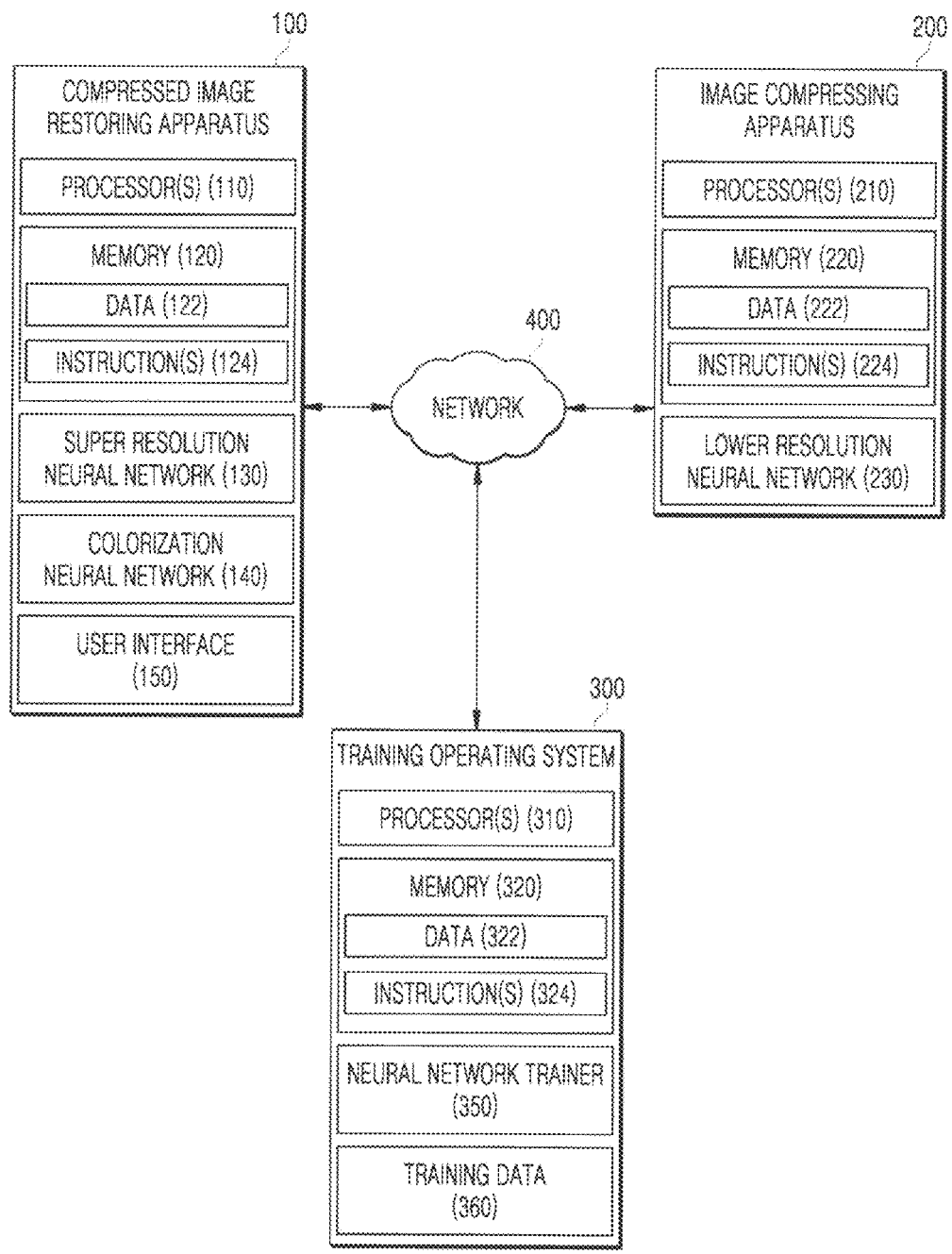
FIG. 1 is an exemplary diagram of an environment for performing an image compressing and restoring method according to an embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the articles "a," "an," and "the," include plural referents unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms may be used herein only to describe various elements, but these elements should not be limited by these terms. These terms are only used to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is an exemplary diagram of an environment for performing an image resolution improving method, according to an embodiment of the present disclosure.

An environment for performing an image resolution improving method, according to an embodiment of the present disclosure, may include a compressed image restoring apparatus 100, an image compressing apparatus 200, a training operating system 300, and a network 400 which allows the above-mentioned components to communicate with each other.

Further, the compressed image restoring apparatus 100 may support intelligent communication such as Internet of Things (IoT), Internet of Everything (IoE), Internet of Small Things (IoST), machine to machine (M2M) communication, and device to device (D2D) communication.

The compressed image restoring apparatus 100 may restore the compressed image using big data, an artificial intelligence (AI) algorithm, and/or a machine learning algorithm in the 5G environment connected for the Internet of Things.

The compressed image restoring apparatus 100 may be any kind of calculating device such as a personal computer, a smart phone, a tablet, a game console, a projector, a wearable device (for example, smart glasses or a head mounted display (HMD)), a set-top box (STB), a desktop computer, a digital signage, a smart TV, or a network attached storage (NAS), and may be implemented by a fixed device or a mobile device.

That is, the compressed image restoring apparatus 100 may be implemented as various home appliances used at home, and may also be applied to a fixed or mobile robot.

The compressed image restoring apparatus 100 may include a wireless communicator (not illustrated) which may transmit or receive data in a 5G environment connected for the Internet of Things. The wireless communicator may include at least one of a broadcast receiving module, a mobile communication module, a wireless Internet module, a short-range communication module, and a position information module.

The broadcast receiving module receives a broadcasting signal and/or broadcasting-related information from an external broadcasting management server through a broadcasting channel.

The mobile communication module transmits and receives a radio signal to and from at least one for example, a base station, an external terminal, and a server on a mobile communication network established according to technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LIE-A)) and 5G (Generation) communication systems.

The wireless Internet module refers to a module for wireless internet connection and may be embedded in the compressed image restoring apparatus 100 or installed on the outside of the compressed image restoring apparatus 100. The wireless Internet module is configured to transmit and receive wireless signals over a communication network that is based on wireless Internet technologies.

The wireless internet technologies may include Wireless LAN (WLAN), Wireless-Fidelity (Wi-Fi), Wi-Fi Direct, Digital Living Network Alliance (DLNA). Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module is for short-range communication, and can support the short-range communication by using at least one of Bluetooth (Bluetooth$^TM$), Radio Frequency Identification (RFID), Infrared Data Association (IrDA), Ultra Wideband (UWB), ZigBee, Near Field Communication (NEC), Wireless-Fidelity (WiFi), Wi-Fi Direct, and Wireless Universal Serial Bus (Wireless USB) technologies.

The position information module is a module for obtaining a position (or a current position) of the mobile compressed image restoring apparatus and a representative example thereof is a global positioning system (GPS) module or a wireless fidelity (WiFi) module. For example, when the GPS module is utilized, the compressed image restoring apparatus may acquire a position of the mobile compressed image restoring apparatus using a signal sent from a GPS satellite.

The compressed image restoring apparatus 100 may include one or more processors 110 and a memory 120.

The one or more processors 110 may include any kind of device which can process data, such as an MCU, a GPU, or an AI accelerator chip. Here, the "processor" may, for example, refer to a data processing device embedded in hardware, which has a physically structured circuitry to perform a function represented by codes or instructions contained in a program.

As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

The processor 110 may determine or predict at least one executable operation of the compressed image restoring apparatus 100 based on information which is determined or generated using data analysis and the machine learning algorithm. To this end, the processor 110 may control the compressed image restoring apparatus to execute a predicted operation or an operation which is determined to be desirable, among at least one executable operation.

The processor 110 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The compressed image restoring apparatus 100 may include an output interlace (not illustrated) which outputs data obtained by processing a result performed in the processor 110.

The output interface is intended to generate an output related to a visual, aural, or tactile stimulus and may include at least one of a display, a sound output module, a haptic module, and an optical output module.

The display displays (outputs) information processed in the compressed image restoring apparatus 100. For example, the display may display execution screen information of an application program driven in the compressed image restoring apparatus 100, and user interface (UI) and graphic user interface (GUI) information in accordance with the execution screen information.

The display may implement a touchscreen by forming a layered structure or being integrated with touch sensors. The touchscreen serves as a user input interface which provides an input interface between the compressed image restoring apparatus 100 and the user and also provides an output interface between the compressed image restoring apparatus 100 and the user.

The memory 120 may include one or more non-transitory storage media such as RAM, ROM, EEPROM, EPROM, a flash memory device, or a magnetic disk. The memory 120 may store data 122 and instructions 124 which are executed by the processors 110 to allow the compressed image restoring apparatus 100 to perform operations.

Further, the compressed image restoring apparatus 100 includes a user interface 150 so as to receive instructions from a user and transmit output information to the user. The user interface 150 may include various input interfaces such as a keyboard, a mouse, a touchscreen, a microphone, or a camera and various output interfaces such as a monitor, a speaker, or a display.

The compressed image restoring apparatus 100 may include an interface (not illustrated) which serves as a passage with various types of external devices connected to the compressed image restoring apparatus 100. The interface may include at least one of a wired/wireless headset port, an external charger port, a wired/wireless data port, a memory card port, a port which connects a device equipped with an identification module, an audio input/output (I/O) port, a video input/output (I/O) port, and an earphone port. The compressed image restoring apparatus 100 may perform appropriate control related to the connected external device in accordance with the connection of the external device to the interface.

The user may select a video which needs to be processed in the compressed image restoring apparatus 100 through the user interface 150. For example, the user may select a video which is wanted to improve a resolution through the mouse, the keyboard, or the touchscreen.

The user interface 150 may include a mechanical input interface (or a mechanical key such as a button located on a front, rear, or side surface of the compressed image restoring apparatus 100, a dome switch, a jog wheel, or a jog switch) and a touch type input interface. For example, the touch type input interface may be formed by a virtual key, a soft key, or a visual key which is disposed on the touchscreen through a software process or a touch key which is disposed on a portion other than the touchscreen.

In one embodiment, the compressed image restoring apparatus 100 may store or include a super resolution neural network 130 and a colorization neural network 140 to which the artificial intelligence technology is applied. For example, the super resolution neural network 130 or the colorization neural network 140 to which the artificial intelligence technology is applied may be various learning models such as a deep neural network or different types of machine learning models, or may include the same.

In the specification, an artificial neural network which is trained using training data to determine a parameter may be referred to as a learning model or a trained model. Unless otherwise stated, the artificial neural network or a neural network of the present disclosure refers to an artificial neural network with a determined parameter.

In the meantime, the super resolution neural network 130, the colorization neural network 140, or a lower resolution neural network 230 of the image compressing apparatus 200 may be implemented by hardware, software, or a combination of hardware and software. When a part or all of the neural network is implemented by software, one or more instructions which configure the neural network may be stored in the memory 120.

Artificial intelligence (AI) is an area of computer engineering science and information technology that studies methods to make computers mimic intelligent human behaviors such as reasoning, learning, and self-improving.

In addition, artificial intelligence does not exist on its own, but is rather directly or indirectly related to a number of other fields in computer science. In recent years, there have been numerous attempts to introduce an element of the artificial intelligence into various fields of information technology to address issues in the respective fields.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

A decision tree refers to an analysis method that uses a tree-like graph or model of decision rules to perform classification and prediction.

A Bayesian network may include a model that represents the probabilistic relationship (conditional independence) among a set of variables. A Bayesian network may be appropriate for data mining via unsupervised learning.

An SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

The Artificial Neural Network is classified into a Single-Layer Neural Network and Multi-Layer Neural Network according to the number of layers.

A general Single-Layer Neural Network is composed of an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, the AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

The Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

A loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use a mean squared error (MSE) or a cross entropy error (CEE), but the present disclosure is not limited thereto.

A cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum. Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad. AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The super resolution neural network 130 or the colorization neural network 140 to which the above-described artificial intelligence technology is applied may be generated by being subjected to a training step by a training operating system 300 and may be stored in the image compressing apparatus 200 to be transmitted to the compressed image restoring apparatus 100 through the network 400, or may be directly transmitted from the training operating system 300. The lower resolution neural network 230 may also be generated by being subjected to the training step by the training operating system 300 and then transmitted to the image compressing apparatus 200.

The training operating system 300 or the image compressing apparatus 200 may transmit a plurality of neural networks trained by machine learning or deep learning to the compressed image restoring apparatus 100 periodically or upon the request. The plurality of neural networks may be the super resolution neural network 130 and the colorization neural network 140.

The super resolution neural network 130 which is an imaging neural network is trained to process a still image or an image frame of a video to output a high resolution image when a low resolution image is input.

The colorization neural network 140 which is an imaging neural network is trained to process a monochrome image to output a color image when the monochrome image is input. In one embodiment, the colorization neural network 140 may use a low resolution color image as a part of an intermediate layer of a neural network for converting a monochrome image into a color image, which will be described below.

Generally, the super resolution neural network 130 may complete the training step in the training operating system 300 and may be transmitted to the image compressing apparatus 200 to be stored in a state that is applicable to the low resolution image. However, in some embodiments, the super resolution neural network 130 may be additionally trained upon the request of the compressed image restoring apparatus 100 or the image compressing apparatus 200 to be updated or upgraded.

In the meantime, the super resolution neural network 130 or the colorization neural network 140 stored in the compressed image restoring apparatus 100 and the lower resolution neural network 230 stored in the image compressing apparatus 200 may be a part of neural networks generated in the training operating system 300. If necessary, new neural networks may be generated in the training operating system 300 to be transmitted to the image compressing apparatus 200 or the compressed image restoring apparatus 100.

As another example, the super resolution neural network 130 or the colorization neural network 140 is stored in the image compressing apparatus 200 rather than the compressed image restoring apparatus 100 and may provide a function required for the compressed image restoring apparatus 100 in the form of a streaming service.

The image compressing apparatus 200 includes processors 210 and a memory 220 and has a larger processing capacity and a larger memory capacity than those of the compressed image restoring apparatus 100. Therefore, if in accordance with the system implementation, the updated neural network requires a larger processing capacity, the neural networks may be stored in the image compressing apparatus 200.

The image compressing apparatus 200 compresses content data received from a content provider (CP) and transmits the compressed image data to the image compressing apparatus 200. In another embodiment, the image compressing apparatus 200 transmits the compressed image data to an edge server of a content delivery network (CDN) and transmits the compressed image data to the compressed image restoring apparatus 100 which requires the transmission of the content from the edge server.

The image compressing apparatus 200 may convert the content data received from the content provider into low resolution content in accordance with the lower resolution neural network 230. Thereafter, the image compressing apparatus 200 may compress the low resolution content using the compression technology of the related art.

The lower resolution neural network 230 which is an imaging neural network is trained to process a still image or an image frame of a video to output a low resolution image when a high resolution image is input.

Similarly to the super resolution neural network 130, the lower resolution neural network 230 completes the training step in the training operating system 300 and is transmitted to the image compressing apparatus 200 to be stored in a state that is applicable to the high resolution image. In some embodiments, the lower resolution neural network is additionally trained upon the request of the image compressing apparatus 200 to be updated or upgraded.

The super resolution neural network 130 and the lower resolution neural network 230 are coupled to each other to be trained, which will be described in detail below.

The super resolution neural network 130, the lower resolution neural network 230, or the colorization neural network 140 included in the compressed image restoring apparatus 100 or the image compressing apparatus 200 may be an imaging neural network generated by the training operating system 300.

Figure 2:
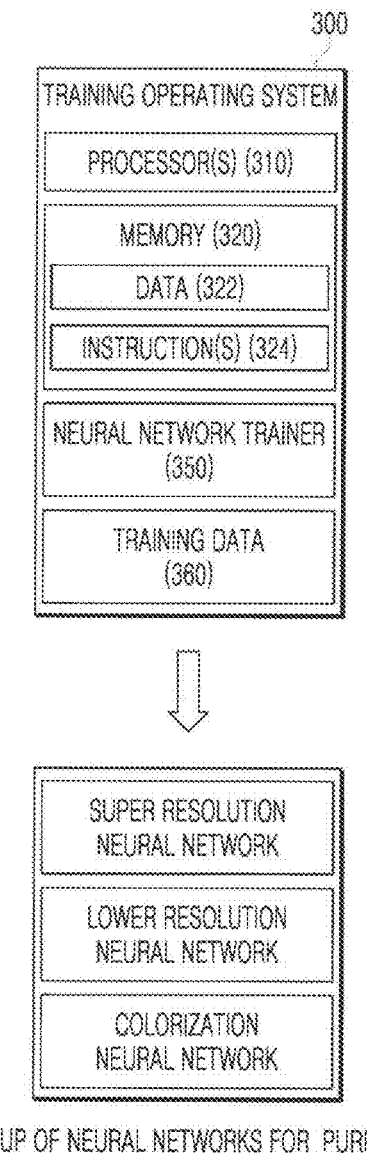
FIG. 2 is a view illustrating a system for generating imaging neural networks according to an embodiment of the present disclosure.

FIG. 2 is a view illustrating a system for generating an imaging neural network according to an embodiment of the present disclosure.

The training operating system 300 may include one or more processors 310 and a memory 320. The training operating system 300 may include a neural network trainer 350 which generates a plurality of neural networks which is applicable to the image. Further, the training operating system 300 may include training data 360 to train the neural networks, and the training data may be a color image.

Specifically, the training operating system 300 may be implemented not only by a single server, but also by a plurality of server sets, a cloud server, or a combination thereof.

That is, a plurality of training operating systems 300 is configured to configure a training operating system set (or a cloud server), and at least one training operating system 300 included in the training operating system set may derive a result by analyzing or learning data through distributed processing.

The training operating system 300 may generate a plurality of neural networks having different structures, such as the super resolution neural network 130, the lower resolution neural network 230, and the colorization neural network 140, through the neural network trainer 350.

For example, the super resolution neural network 130 may be trained as an imaging neural network in which two hidden layers are formed, and the lower resolution neural network 230 may be trained as an imaging neural network in which four hidden layers are formed.

Here, in the structure of the imaging neural network, a number of input nodes, a number of features, a number of channels, a number of hidden layers, and a type and a number of kernels for generating a convolution layer, for example, may vary depending on the purpose of the neural network.

Figure 3:
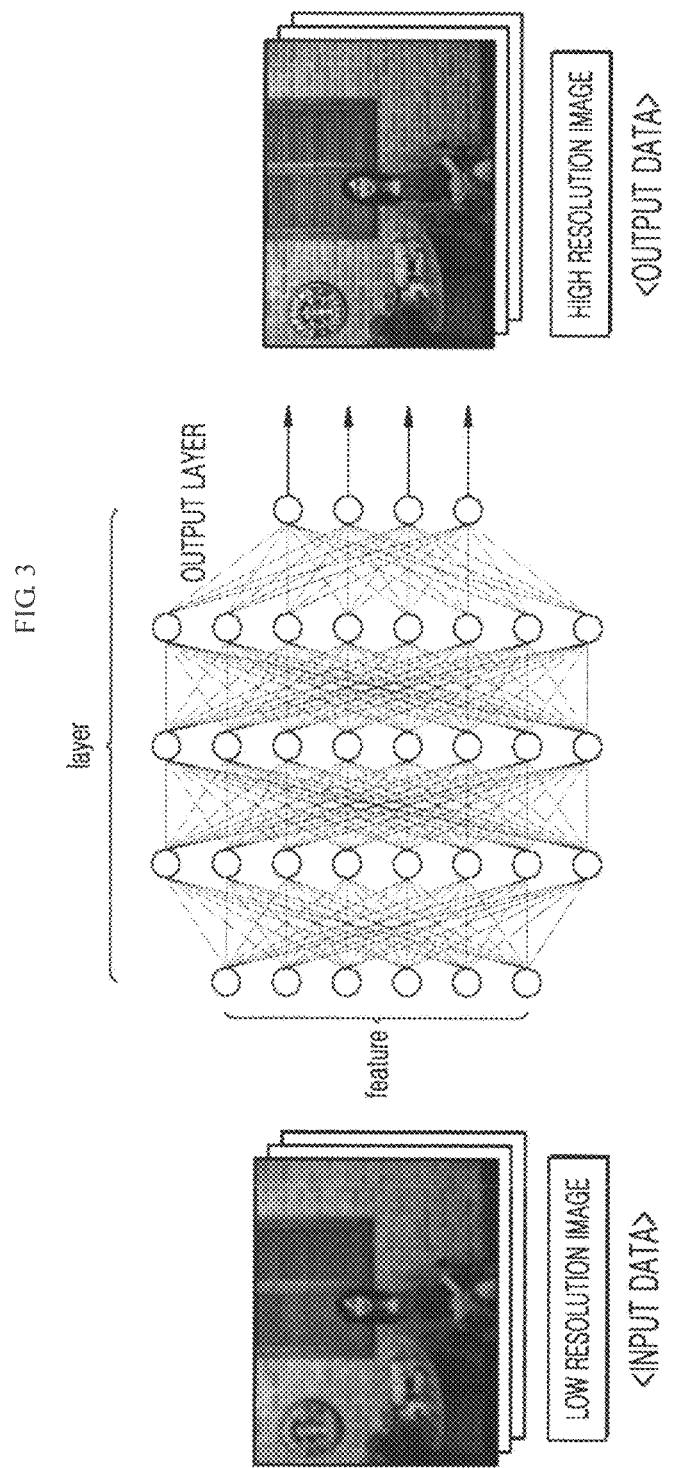
FIG. 3 is a diagram illustrating a super resolution neural network according to an embodiment of the present disclosure.

FIG. 3 is a diagram illustrating a super resolution neural network 130 for image processing according to an embodiment of the present disclosure.

The super resolution neural network 130 and the lower resolution neural network 230 may be configured by an input layer, a hidden layer, and an output layer. The number of input nodes or a size of a feature map may be determined in accordance with the number of features or kernels, and as the number of nodes or the size of the feature map is increased, the complexity or the dimensionality of the neural network may be increased. Further, as the number of hidden layers is increased, the complexity or the dimensionality of the neural network is increased. The hidden layer may include a convolution layer, a pulling layer, or an activation layer.

The number of features or kernels, the number of hidden layers, and the number of nodes of each layer may be determined by a neural network designer, and as the complexity is increased, the processing time is increased but better performance may be achieved.

Figure 4:
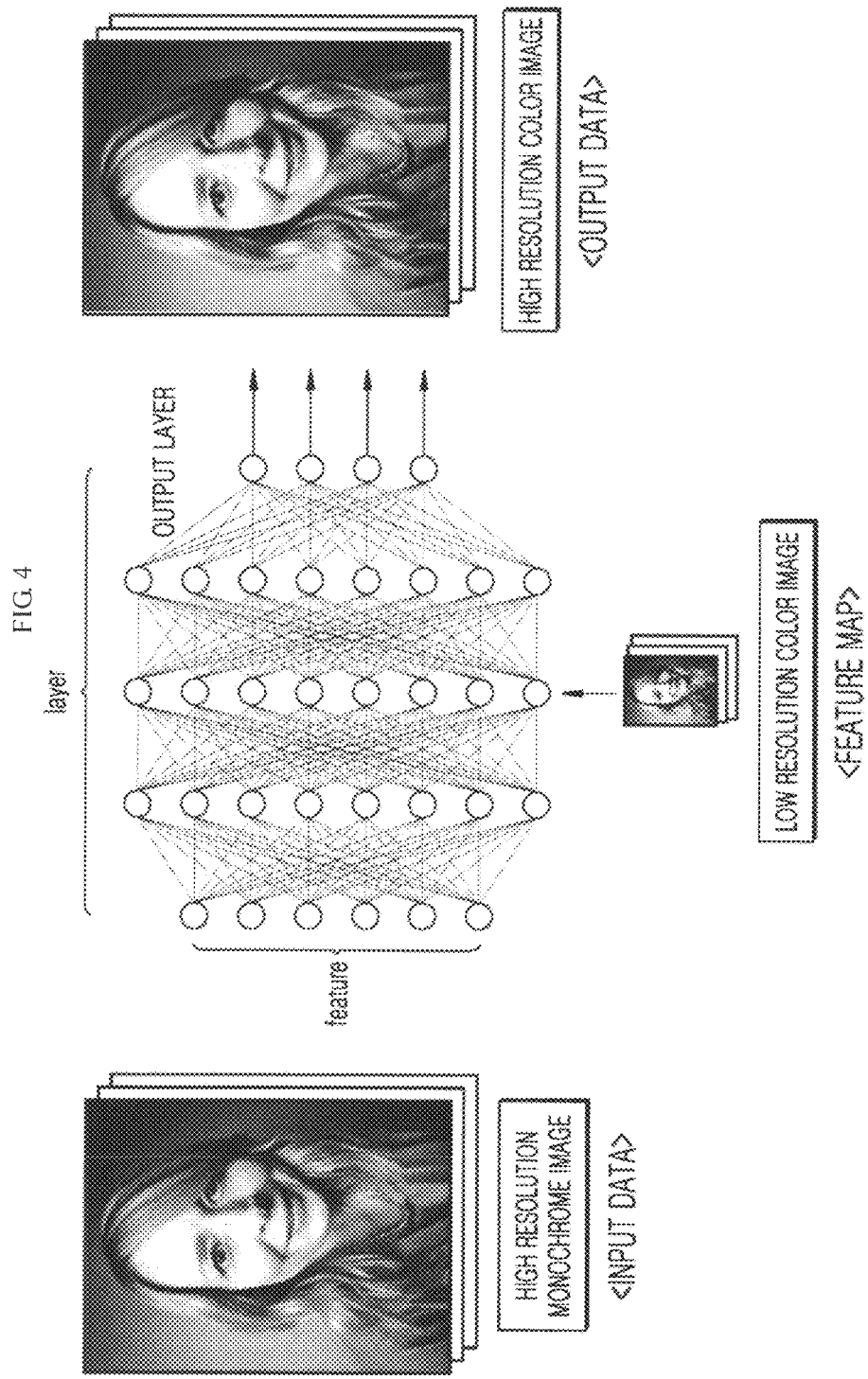
FIG. 4 is a diagram illustrating a colorization neural network according to an embodiment of the present disclosure.

Even though in FIGS. 3 and 4, it is illustrated that the input layer is configured by nodes, the input layer and the intermediate layer of the super resolution neural network 130, the lower resolution neural network 230, or the colorization neural network 140 may be feature maps which are represented as a result of convoluting through the kernel. The kernel may be a two-dimensional mask. An output of the output layer may be an image.

The convolution layer performs a weight operation shared by receiving an output value of the previous layer or an input image to generate a feature map, and the pulling layer reduces a dimension of the feature map by maximum value pulling or average value pulling from the generated feature map. An activation function of the activation layer may be one of various activation functions such as a sigmoid function or a rectifier linear unit (ReLU). An activation function of the intermediate layer may be different from an activation function of the output layer.

When an initial neural network structure of the super resolution neural network 130 or the lower resolution neural network 230 is designed, the initial neural network may be trained using training data. A high resolution original image is necessary to train the super resolution neural network 130 or the lower resolution neural network 230. A method of coupling the super resolution neural network 130 and the lower resolution neural network 230 to be trained will be described with reference to FIG. 12.

Figure 12:
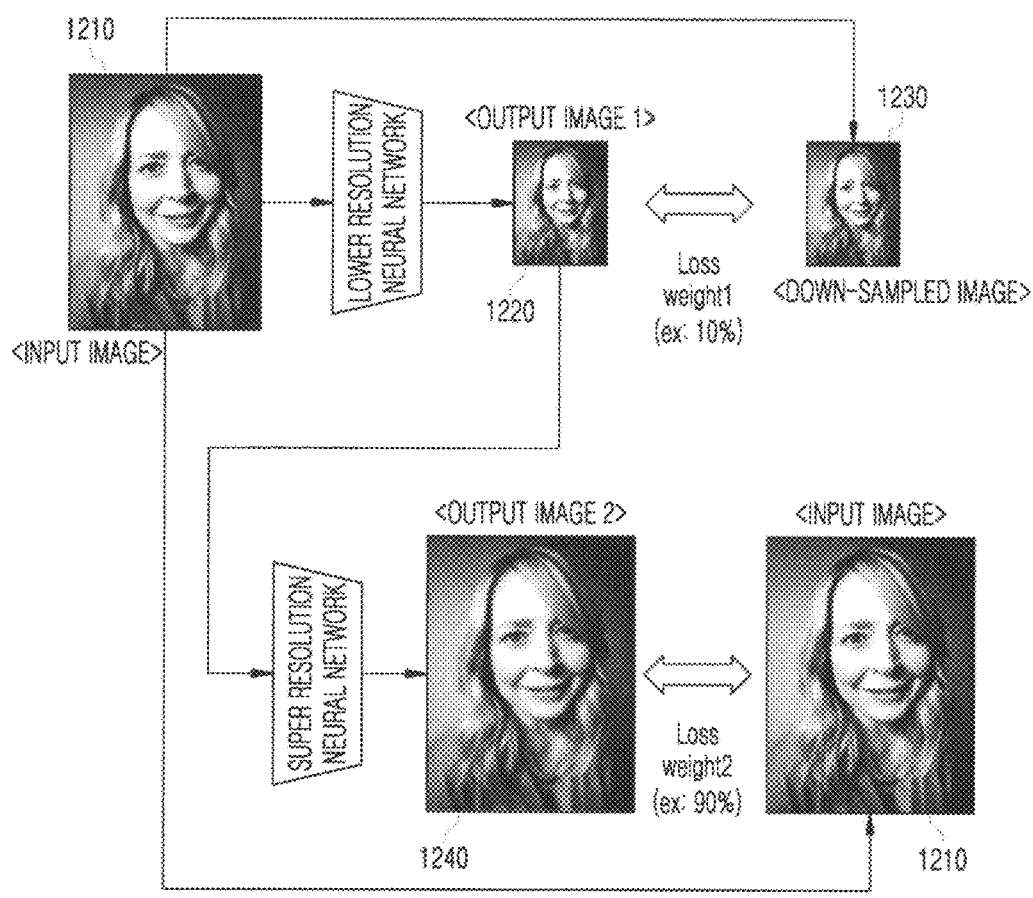
FIG. 12 is a view illustrating a process of coupling and training a super resolution neural network and a lower resolution neural network, according to an embodiment of the present disclosure.

FIG. 12 is a view for explaining a method of coupling and training the super resolution neural network 130 for image processing and the lower resolution neural network 230 according to the embodiments of the present disclosure.

After collecting high resolution original images 1210, distortion processing such as blur, down sampling such as bicubic down sampling, or noise injection are performed on the corresponding image to prepare first low resolution images 1230 corresponding to high resolution original images.

When the first low resolution images 1230 corresponding to the high resolution original images 1210 are coupled as a label, the training operating system 300 may train the lower resolution neural network 230 to lower an image resolution. A loss function of the lower resolution neural network 230 may be a value obtained by comparing second low resolution images 1220 output from the lower resolution neural network 230 and the first low resolution images 1230.

The training operating system 300 couples, as a label, the high resolution original images 1210 corresponding to the second low resolution images 1220 output from the lower resolution neural network 230, to train the super resolution neural network 130 for improving the image resolution. A loss function of the super resolution neural network 130 may be a value obtained by comparing high resolution images 1240 output from the super resolution neural network 130 and the high resolution original images 1210.

The training operating system 300 may train two neural networks so as to simultaneously minimize the loss function of the lower resolution neural network 230 and the loss function of the super resolution neural network 130. That is, an image output from the lower resolution neural network 230 is again used as an input image of the super resolution neural network 130, an input image of the lower resolution neural network 230 is used as an image to be compared with the output image of the super resolution neural network 130, and two neural networks are trained to simultaneously minimize the loss functions of two neural networks so that two neural networks are trained while influencing each other. This learning method is referred to as a coupled learning method of the super resolution neural network 130 and the lower resolution neural network 230 in this specification.

The training operating system 300 may train two neural networks by assigning a weighting coefficient (weighting factor) to a loss function value of the lower resolution neural network 230 and a loss function value of the super resolution neural network 130. For example, when a higher weighting coefficient is assigned to the loss function value of the super resolution neural network 130, even though the two neural networks are coupled to be trained, the two neural networks may be trained so as to increase a learning efficiency of the super resolution neural network 130 more than the other.

Therefore, in order to reduce the degradation in image quality due to compression and restoration, the training operating system 300 assigns a higher weighting coefficient to the loss function value of the super resolution neural network 130. Further, in order to increase compression efficiency, a higher weighting coefficient may be assigned to the loss function value of the lower resolution neural network 230.

A processing speed and a processing performance of the imaging neural network may have a trade-off relationship and a designer may generate a set of various super resolution neural networks 130 and lower resolution neural networks 230 having different processing speeds and different processing performances by changing an initial structure of the neural network. Therefore, a super resolution neural network 130 which is applicable in compressed image restoring apparatuses 100 having different performances is generated and the image compressing apparatus 200 may compress an image using the lower resolution neural network 230 which is coupled to the super resolution neural network 130 of the compressed image restoring apparatus 100 to be trained.

For example, in accordance with the configuration of the initial neural network, the training operating system 300 may generate a high complexity set of the high resolution neural network 130 and the lower resolution neural network 230, which has a long processing time but provides an improved performance, or generate a low complexity set of the high resolution neural network 130 and the lower resolution neural network 230, which provides a lower performance but has a shortened processing time.

As described above, a set of the super resolution neural network 130 and the lower resolution neural network 230 having various structures or complexities which can be used in the compressed image restoring apparatus 100 having various performances may be formed. In one embodiment, the image compressing apparatus 200 may transmit, to the image restoring apparatus 100, any one image data among image data which is compressed in various manners depending on the complexity of the neural network, in consideration of the performance of the compressed image restoring apparatus 100. In this case, the image compressing apparatus 200 may transmit identification information of the super resolution neural network 130 used for image compression or the lower resolution neural network 230 required to restore an image to the compressed image restoring apparatus 100, together with the compressed image data.

The super resolution neural network 130 or the lower resolution neural network 230 may be implemented by hardware, software, or a combination of hardware or software. When a part or all of the super resolution neural network 130 or the lower resolution neural network 230 is implemented by software, one or more instructions or parameters of the super resolution neural network 130 or the lower resolution neural network 230 may be stored in memories 120, 220, and 320.

FIG. 4 is a diagram illustrating a colorization neural network 140 for image processing according to an embodiment of the present disclosure.

The colorization neural network 140 may be configured by an input layer, a hidden layer, and an output layer, similarly to the super resolution neural network 130 or the lower resolution neural network 230. A neural network configured by a plurality of hidden layers including a convolution layer, an activation layer, and a pulling layer is applied to an input monochrome image to output a color image obtained by adding colors to the input monochrome image.

The colorization neural network 140 may use a low resolution color image obtained by lowering, using a down sampling method, a resolution of an original color image of a monochrome image input as a part of an intermediate layer of the neural network, which will be described in detail below.

Figure 5:
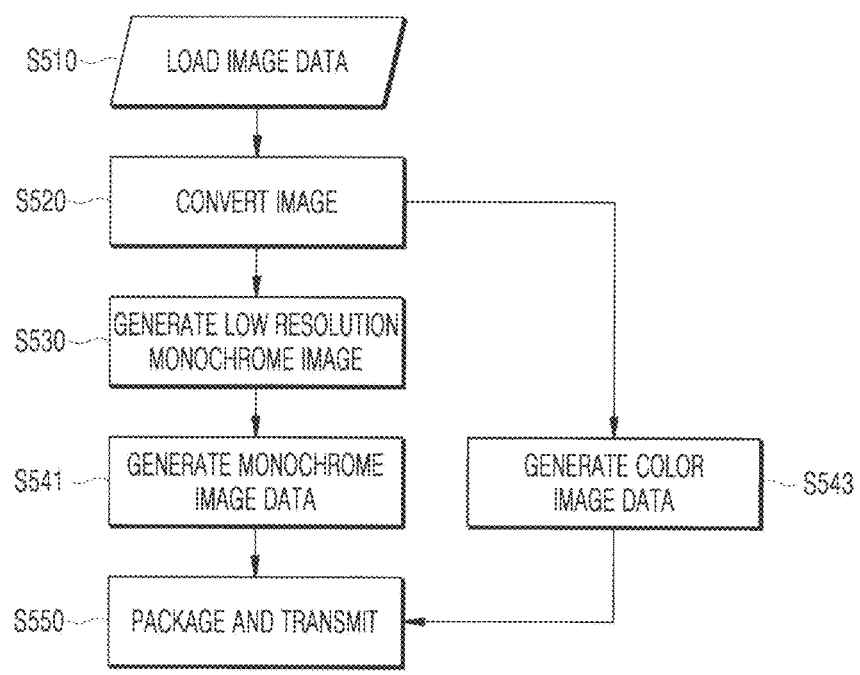
FIG. 5 is a flowchart illustrating an image compressing method of an image compressing apparatus according to an embodiment of the present disclosure.
Figure 6:
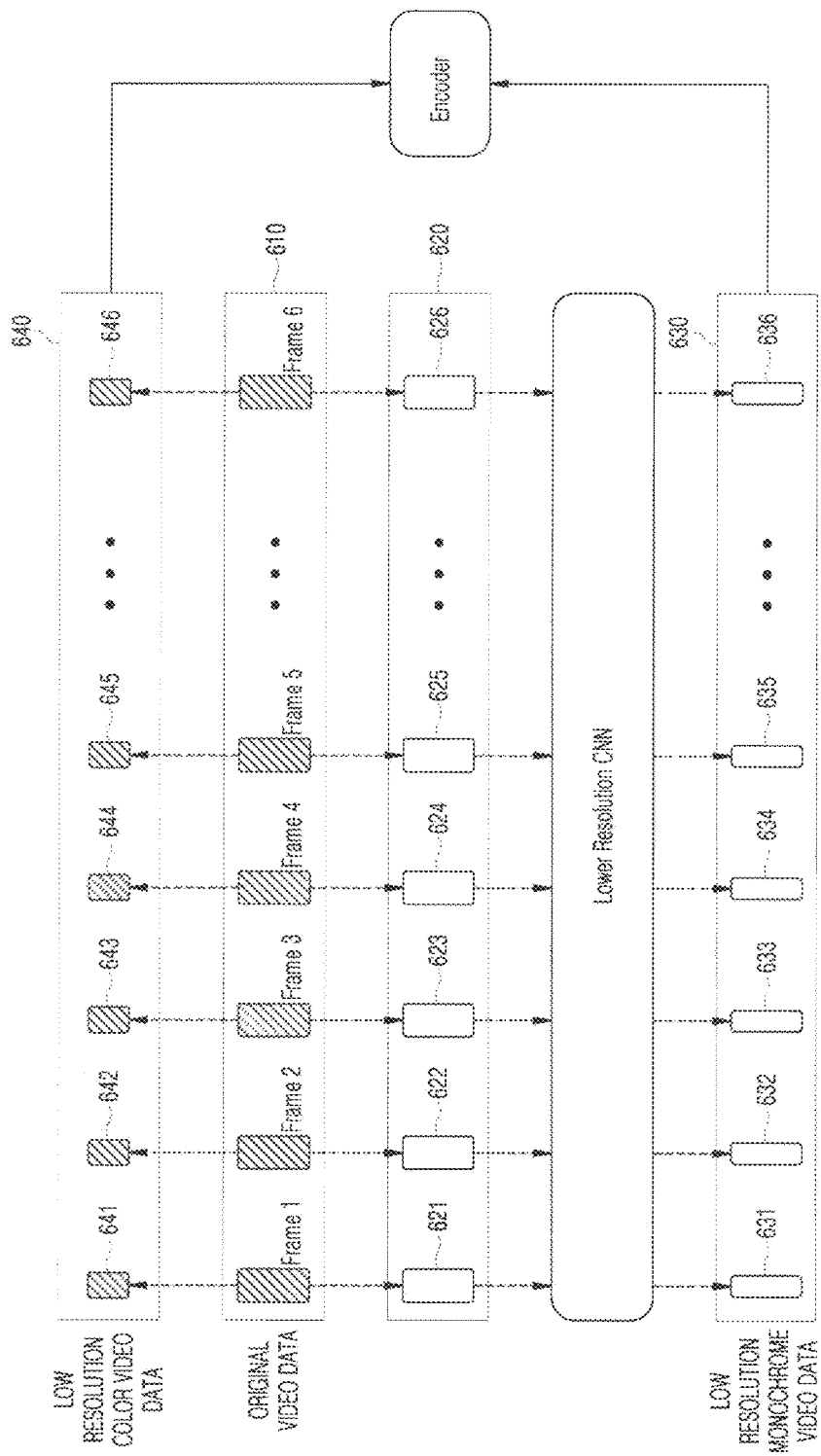
FIGS. 6 and 7 are views illustrating a process of performing, on a video, an image compressing method according to an embodiment of the present disclosure.
Figure 7:
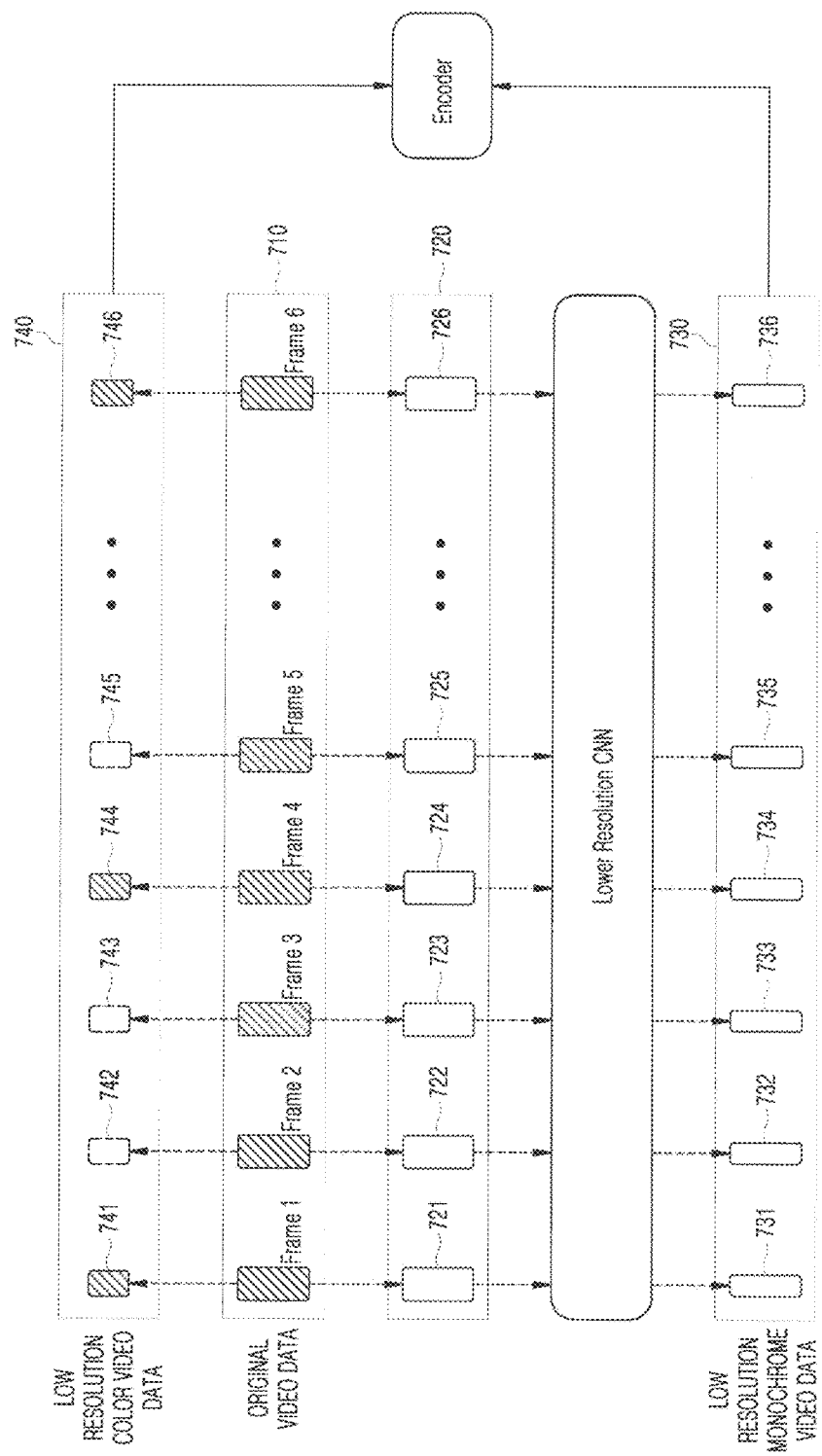

FIG. 5 is an embodiment of an image compressing method according to an embodiment of the present disclosure, and FIGS. 6 and 7 are views illustrating a process of performing, on video data, an image compressing method according to an embodiment of the present disclosure.

The image compressing apparatus may have the same configuration as the image compressing apparatus 200 illustrated in FIG. 1. First, the image compressing apparatus may load image data 610 (S510). The image data may be captured by a device mounted with a camera or may be data received from an external device over wired/wireless communication. Further, the image data may be still image data configured by a single image or video data configured by a plurality of images.

The image compressing apparatus may extract a high resolution image frame from the loaded image and convert the high resolution color image frame into a high resolution monochrome image (S520).

The high resolution monochrome image may be an image generated by converting a high resolution color image frame into a CIE L*a*b color space and then extracting an L* value. The high resolution monochrome image may be generated by converting a high resolution color image frame into a YUV color space and then extracting a Y value. Therefore, the high resolution monochrome image may require only one third of a storage space of the high resolution color image frame.

The image compressing apparatus may input the high resolution monochrome image into a lower resolution neural network to generate a low resolution monochrome image (S530).

The image compressing apparatus may convert the high resolution color image frame into a low resolution color image which has a lower resolution (S520). Therefore, the high resolution color image may require only 1/N^2 of a storage space of the high resolution color image frame.

Referring to FIG. 6, the image compressing apparatus extracts a first image frame of original color video data 610 to convert the first image frame into a monochrome image 621 having the same resolution as that of the first image frame, and inputs the converted monochrome image to the lower resolution neural network to generate a monochrome image 631 having a lower resolution than that of the first image frame. The image compressing apparatus may perform the same process on subsequent image frames of the original color video data 610 and a plurality of frames 621 to 626 of the video data 610 is processed in parallel to be generated as a plurality of monochrome images 631 to 636.

Further, the image compressing apparatus extracts the first image frame of the original color video data 610 to convert the first image frame into a low resolution color image 641 having a lower resolution than that of the first image frame.

The image compressing apparatus encodes the low resolution color image 640 and the low resolution monochrome image 630 to generate color image data and monochrome image data (S541 and S543). As the encoding method, various encoding methods of the related art for compressing, such as DCT or HEVC, may be used and a type of the encoding is not specifically limited.

In another embodiment, the image compressing apparatus extracts only some low resolution color images among the encoded low resolution color images to generate color image data.

Referring to FIG. 7, the image compressing apparatus converts all frames of the high resolution color image data 710 into low resolution color images 741 to 746 with a reduced resolution, and then generates color image data using the encoded low resolution color images corresponding to some low resolution color images 741, 744, and 746 among images obtained by encoding the converted low resolution color images.

For example, the image compressing apparatus encodes the low resolution color images and then generates color image data only with low resolution color images corresponding to intra frames, or generates color image data only with the low resolution color images corresponding to a predetermined interval.

Therefore, an amount of color image data which is transmitted to the compressed image restoring apparatus may be reduced. However, in this case, when a low resolution color image which is synchronized with the low resolution monochrome image is not received (742, 743, and 745), the compressed image restoring apparatus uses the low resolution color images 741 and 744 corresponding to a previous frame or the intra frame for the colorization neural network, so that a quality of colorization for the monochrome image may be degraded.

The color image data may be encoded in synchronization with the monochrome image data.

The image compressing apparatus may transmit the generated monochrome image data and color image data to the compressed image restoring apparatus.

Figure 8:
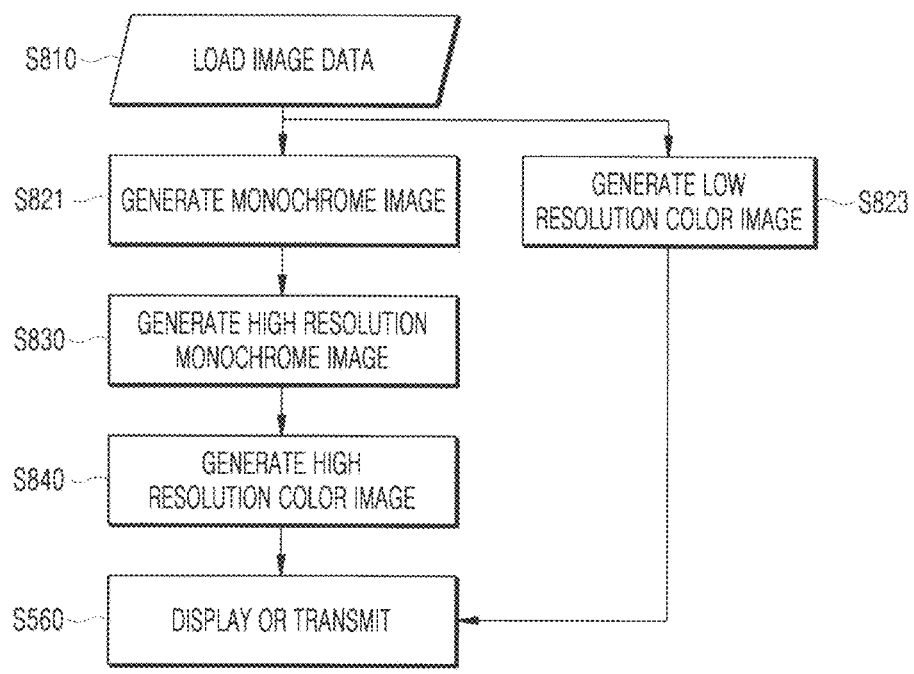
FIG. 8 is a flowchart illustrating a compressed image restoring method of a compressed image restoring apparatus according to an embodiment of the present disclosure.
Figure 9:
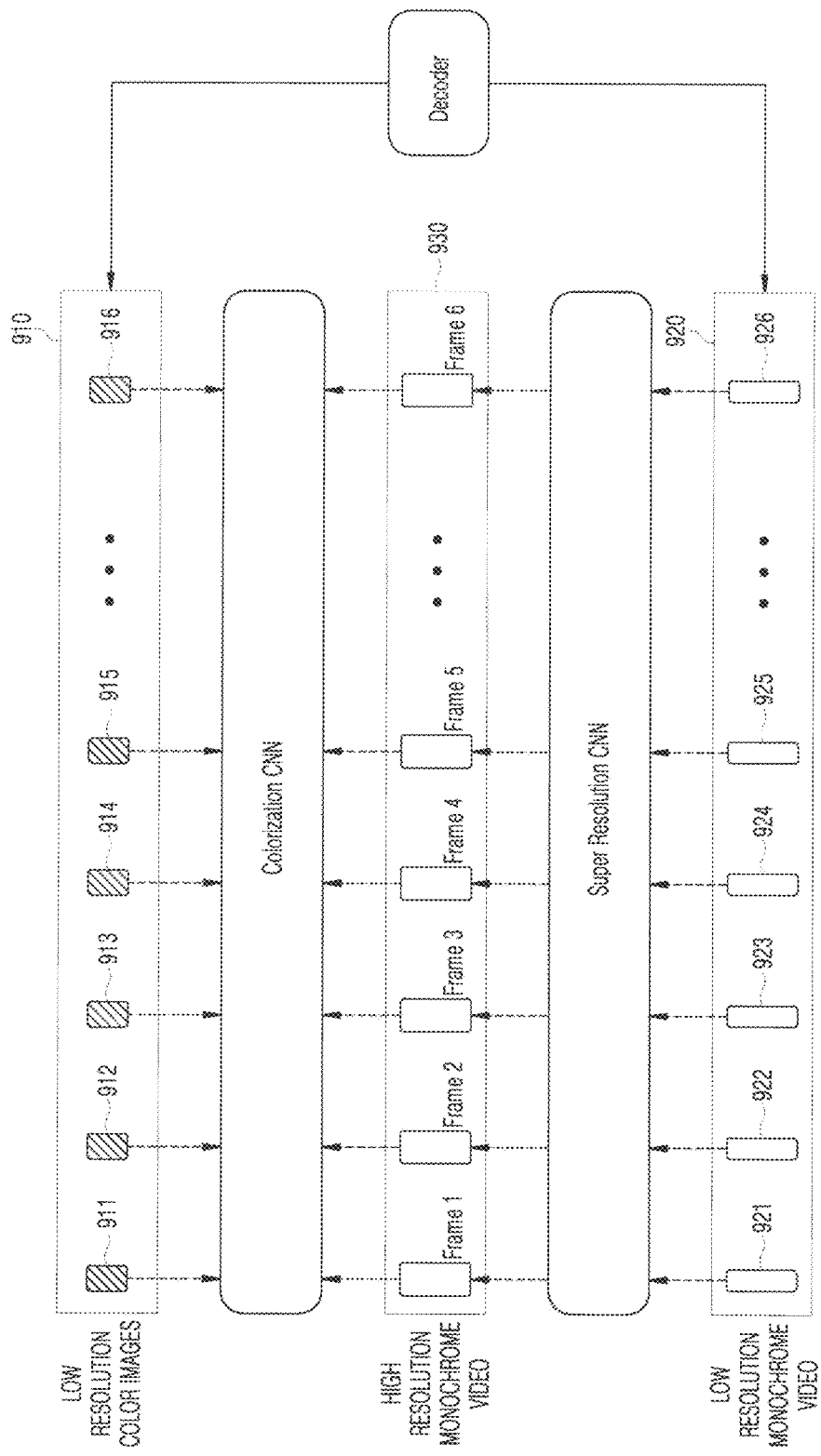
FIGS. 9 and 10 are views illustrating a process of performing, on a video, a compressed image restoring method according to an embodiment of the present disclosure.
Figure 10:
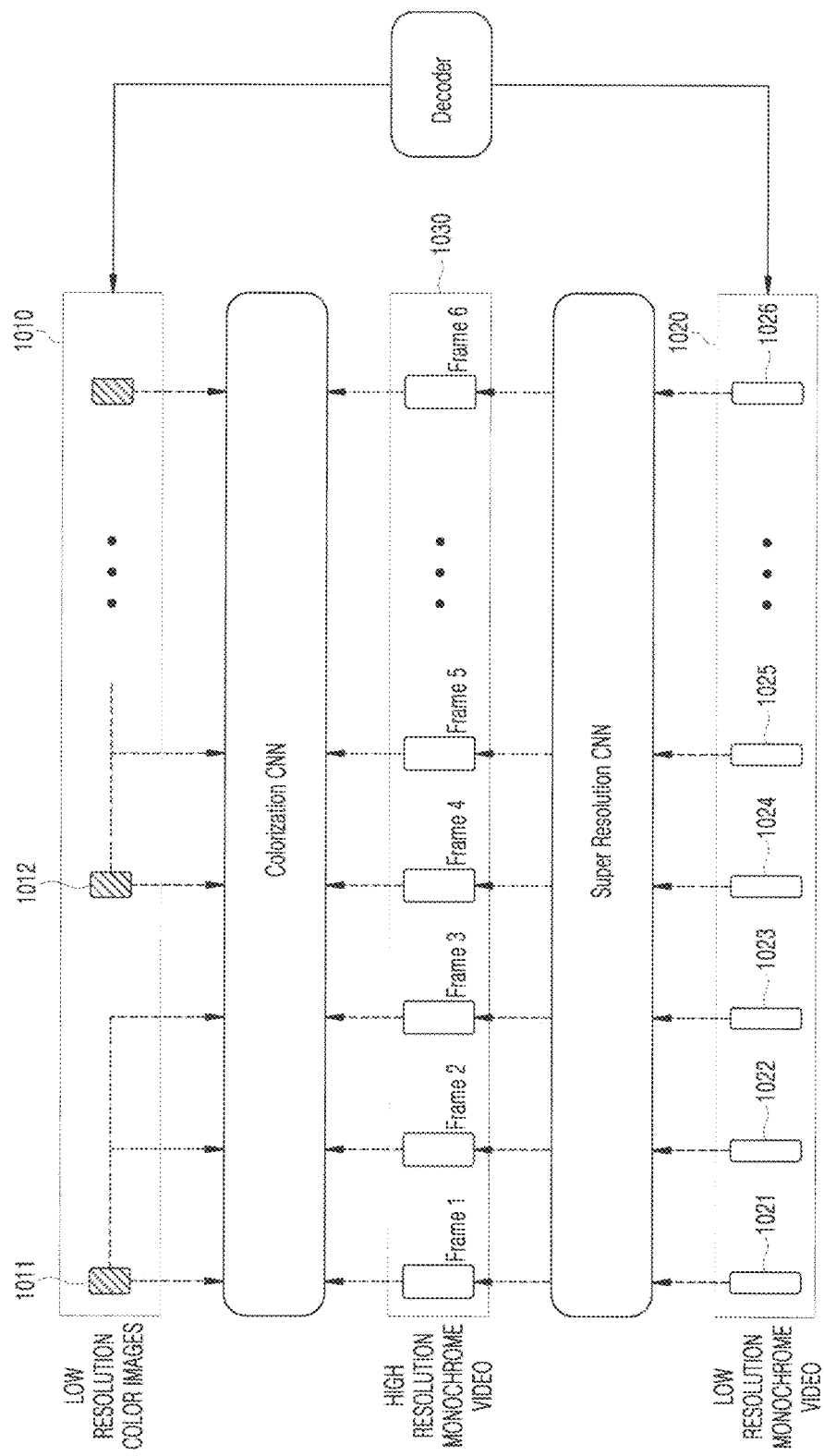

FIG. 8 is an embodiment of a compressed image restoring method according to an embodiment of the present disclosure, and FIGS. 9 and 10 are views illustrating a process of performing, on video data, a compressed image restoring method according to an embodiment of the present disclosure.

The compressed image restoring apparatus may have the same configuration as the compressed image restoring apparatus 100 illustrated in FIG. 1. First, the compressed image restoring apparatus may receive image data (S810). The image data may be captured by a device mounted with a camera or may be data received from an external device through wired/wireless communication. Further, the image data may be still image data configured by a single image or video data configured by a plurality of images. Further, the reception of image data includes reception of streaming data by a real-time streaming method through wired/wireless communication.

The compressed image restoring apparatus may be a general user terminal such as a computer, a smart phone, or a tablet, and may also be a device serving as a server or a set-top box device which receives image data to improve the resolution of each image and transmits the result to a connected external device (for example, a monitor, a projector, a display, or a TV).

The compressed image restoring apparatus decodes monochrome image data and color image data of the received image data to generate a low resolution monochrome image and a low resolution color image (S821 and S823). The decoding method may be one inverse transform method of the above-described encoding method.

The compressed image restoring apparatus may input the low resolution monochrome image to the super resolution neural network to generate a high resolution monochrome image (S830).

Thereafter, the compressed image restoring apparatus inputs the high resolution monochrome image to the colorization neural network and uses the low resolution color image as a part of an intermediate layer to generate a high resolution color image (S840).

Referring to FIG. 9, the compressed image restoring apparatus decodes the received image data to generate low resolution color image data 910 and low resolution monochrome image data 920.

The compressed image restoring apparatus extracts a first image frame 921 of the low resolution monochrome image data and inputs the first image frame to the super resolution neural network to generate the high resolution monochrome image. Thereafter, the compressed image restoring apparatus inputs the generated high resolution monochrome image Frame 1 to the colorization neural network again and uses the low resolution color image 911 which is synchronized with the first image frame 921 of the low resolution monochrome image data as a part of any feature map of the intermediate layers of the colorization neural network to generate a high resolution color image.

Alternatively, a value of a channel (feature) of a convolution layer and a value of the feature of the low resolution color image 911 may be processed by element-wise addition. However, in this case, the number of features of the convolution layer and the number of features of the low resolution color image need to equal each other so that the convolution layer may be adjusted, or only some of the features (channels) may be processed by element-wise addition.

In another embodiment, the compressed image restoring apparatus may use low resolution color images obtained by encoding only some of the low resolution color images, for the colorization neural network.

Referring to FIG. 10, when the color image data does not have a low resolution color image corresponding to the high resolution monochrome image Frame 2 input to the colorization neural network, the compressed image restoring apparatus may use the low resolution color image 1011 corresponding to the previous frame Frame 1, for the colorization neural network.

The compressed image restoring apparatus may determine whether there is a color image corresponding to the monochrome image using synchronization information of the monochrome image data and the color image data. For example, frames of the color image data and the monochrome image data may have frame IDs in accordance with the order of frames of original image data before conversion.

A colorization process of a monochrome image according to the colorization neural network will be described with reference to FIG. 11.

The compressed image restoring apparatus convolutes, using a plurality of kernels, the high resolution monochrome image 1110 generated from the super resolution neural network, to generate a first feature map 1120.

Alternatively, the compressed image restoring apparatus convolutes the high resolution monochrome image 1110 generated from the super resolution neural network and applies an activation function to generate a first activation map 1120. The activation function may be LeRU function. Hereinafter, the feature map is described as an example.

Figure 11:
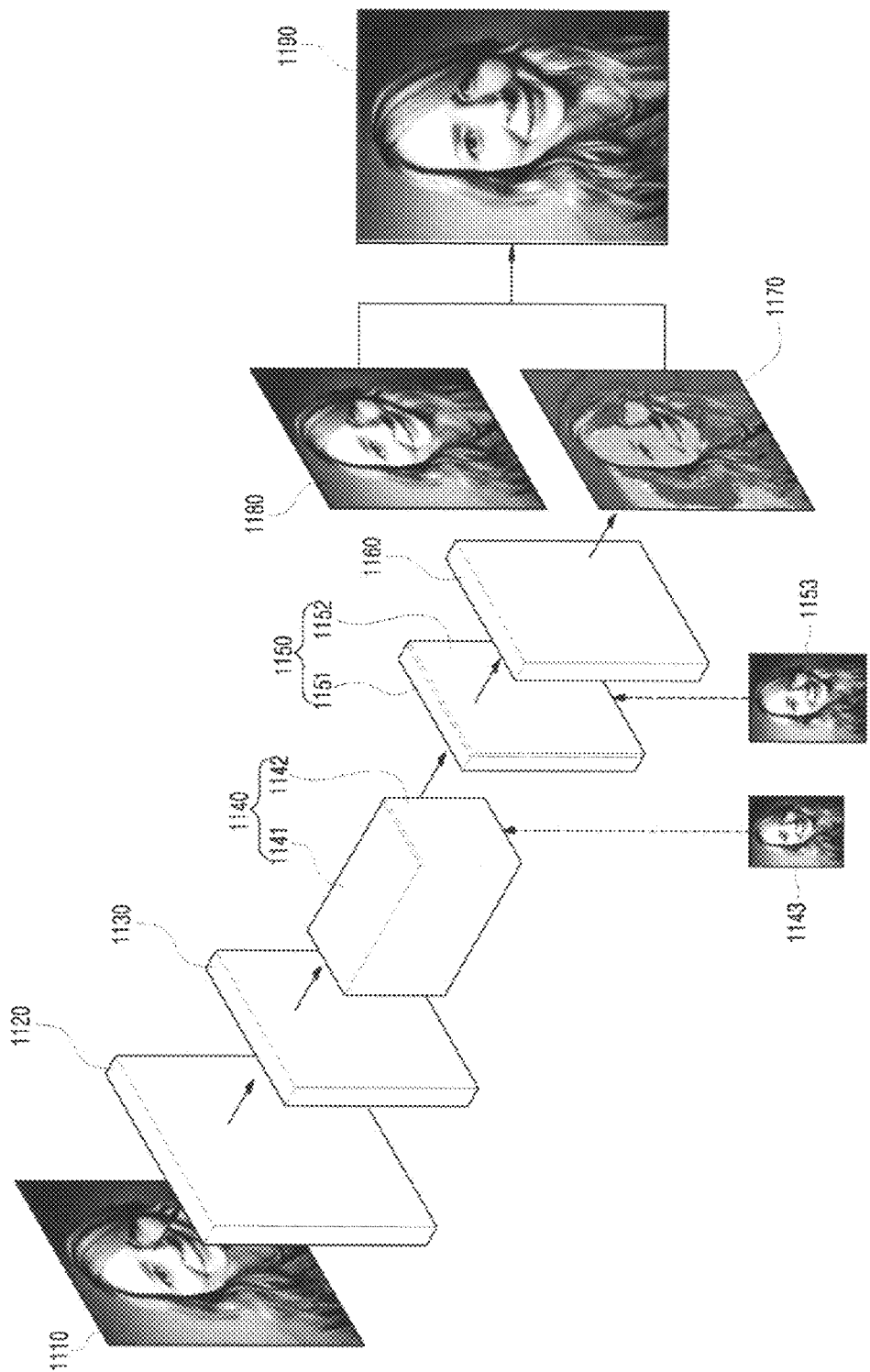
FIG. 11 is a view illustrating a process of generating a high resolution color image by a colorization neural network, according to an embodiment of the present disclosure.

In FIG. 11, five feature maps or activation maps 1120, 1130, 1140, 1150, and 1160 are illustrated as examples, but the number of feature maps or activation maps is not specifically limited.

The compressed image restoring apparatus applies a pulling layer (not illustrated) to the first feature map 1120 and again uses a convolution using a plurality of kernels to generate a second feature map 1130. Channels (depths) of the second feature map may number more than the channels of the first feature map.

The compressed image restoring apparatus generates a third temporary feature map 1141 using a similar method and generates a third feature map 1140 using the low resolution color image as a part 1142 of the channels of the third temporary feature map 1141.

The compressed image restoring apparatus performs up-sampling on the third feature map 1140 to generate a fourth feature map 1150. Alternatively, similarly to the above-described third feature map, the low resolution color image is subjected to up-sampling in accordance with a size of the fourth temporary feature map 1151 and then used as a part 1152 of a channel of the fourth feature map 1150.

That is, the compressed image restoring apparatus may use a color image obtained by improving a resolution of the low resolution color image (but is lower than a resolution of the high resolution monochrome image) as a part of the channel of the intermediate layer of the colorization neural network.

The compressed image restoring apparatus may generate a color image with an improved resolution corresponding to the low resolution color image using not only interpolation such as Bi-linear interpolation but also the super resolution neural network.

In the colorization neural network, a fifth layer may be configured by a convolution layer which generates at least one chrominance image and an activation function. The activation function may be a sigmoid function. The chrominance image may be an image related to a*b* components of CIE L*a*b* or an image related to a YV component of YUV.

The compressed image restoring apparatus may generate the high resolution color image by coupling the chrominance image and the high resolution monochrome image.

The present disclosure described above can be embodied as computer-readable codes on a medium on which a program is recorded. The computer readable medium includes all types of recording devices in which data readable by a computer system readable can be stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. Moreover, the computer may include a processor 110 of a terminal.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the exemplary embodiments described above, and rather intended to include the following appended claims, and all modifications, equivalents, and alternatives falling within the spirit and scope of the following claims.

What is claimed is:

1. A method for restoring a compressed image by an electronic device, the method comprising:
    receiving monochrome image data and low resolution color image data each generated from an original color image;
    decoding the monochrome image data and generating a low resolution monochrome image;
    decoding the low resolution color image data generating a low resolution color image;
    processing the low resolution monochrome image and generating a high resolution monochrome image in accordance with a super resolution imaging neural network; and
    generating a high resolution color image based on the low resolution color image and the high resolution monochrome image in accordance with a colorization imaging neural network, wherein a part of an intermediate layer of the colorization imaging neural network is based on the low resolution color image or an intermediate resolution color image having a resolution improved from that of the low resolution color image, and wherein the generating the high resolution color image comprises inserting the low resolution color image or the intermediate resolution color image into one channel of the intermediate layer or performing element-wise addition on a value of at least one channel of the intermediate layer and a value of a feature of the low resolution color image or the intermediate resolution color image.

2. The method according to claim 1, wherein the monochrome image data and the low resolution color image data are video data which are synchronized with each other, and wherein the part of the intermediate layer of the colorization imaging neural network is based on the low resolution color image corresponding to the low resolution monochrome image of the monochrome image data.

3. The method according to claim 2, wherein the part of the intermediate layer of the colorization imaging neural network is based on the low resolution color image corresponding to an intra frame of a group of pictures (GOP) including the low resolution monochrome image.

4. The method according to claim 2, wherein the part of the intermediate layer is based on the low resolution color image corresponding to a previous frame of the low resolution monochrome image or the low resolution color image corresponding to a frame which is referenced by the low resolution monochrome image.

5. The method according to claim 1, further comprising:
generating at least one chrominance image at an output layer of the colorization imaging neural network; and
generating the high resolution color image by synthesizing the chrominance image and the high resolution monochrome image.

6. The method according to claim 5, further comprising:
up-sampling the chrominance image; and
generating the high resolution color image by synthesizing chrominance information of the up-sampled chrominance image and brightness information of the high resolution monochrome image.

7. A non-transitory computer readable recording medium which stores a computer program configured to allow a computer to execute the method according to claim 1 when the computer program is executed by the computer.

8. An apparatus for restoring compressed image, comprising:
a processor; and
a memory which is electrically coupled with the processor and is configured to store at least one of at least one code executed in the processor, a parameter of a super resolution imaging neural network, or a parameter of a colorization imaging neural network,
wherein when the memory is executed by the processor, the memory stores codes which cause the processor to decode monochrome image data and low resolution color image data generated from an original color image, generate a low resolution monochrome image and a low resolution color image, generate a high resolution monochrome image by processing the low resolution monochrome image in accordance with the super resolution imaging neural network, and generate a high resolution color image by using the low resolution color image and processing the high resolution monochrome image in accordance with the colorization imaging neural network, and
wherein the super resolution imaging neural network is coupled to and simultaneously trained with a lower resolution imaging neural network so as to generate a monochrome image having a first resolution using, as an input, a monochrome image having a second resolution generated from the monochrome image having the first resolution by the lower resolution imaging neural network of an image compressing apparatus, and the first resolution is higher than the second resolution.

* * * * *